(12) United States Patent
Sugita et al.

(10) Patent No.: US 7,144,647 B2
(45) Date of Patent: Dec. 5, 2006

(54) FUEL CELL STACK

(75) Inventors: Narutoshi Sugita, Wako (JP); Tadashi Nishiyama, Wako (JP); Ken Takahashi, Wako (JP); Seiji Sugiura, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 5 days.

(21) Appl. No.: 09/952,235

(22) Filed: Sep. 12, 2001

(65) Prior Publication Data

US 2002/0031697 A1 Mar. 14, 2002

(30) Foreign Application Priority Data

Sep. 11, 2000 (JP) ............................ P2000-275579

(51) Int. Cl.
*H01M 8/02* (2006.01)
*H01M 8/10* (2006.01)
*H01M 2/00* (2006.01)
*B60K 1/00* (2006.01)

(52) U.S. Cl. ............................ 429/32; 429/34; 429/37; 429/30; 180/65.1; 180/65.3; 180/68.5

(58) Field of Classification Search ................ 429/32, 429/34, 37; 180/65.1, 65.3, 68.5, 54.1; 105/51; 248/500, 503
See application file for complete search history.

(56) References Cited

U.S. PATENT DOCUMENTS

| | | | | |
|---|---|---|---|---|
| 4,550,795 | A | * | 11/1985 | Teshima ..................... 180/296 |
| 5,052,198 | A | * | 10/1991 | Watts ........................... 70/58 |
| 6,110,612 | A | * | 8/2000 | Walsh ........................... 429/13 |
| 6,455,179 | B1 | * | 9/2002 | Sugita et al. .................. 429/12 |
| 6,479,180 | B1 | * | 11/2002 | Uozumi ........................ 429/34 |
| 6,715,195 | B1 | * | 4/2004 | Erickson ....................... 29/434 |
| 2002/0034673 | A1 | * | 3/2002 | Bisaka et al. ................. 429/37 |
| 2002/0076601 | A1 | * | 6/2002 | Guthrie et al. ................ 429/39 |

FOREIGN PATENT DOCUMENTS

| | | |
|---|---|---|
| DE | 43 45 319 C2 | 3/1994 |
| EP | 0-814 528 A2 | 12/1997 |
| JP | 5-299111 | 11/1993 |
| JP | 08-171926 | 7/1996 |

OTHER PUBLICATIONS

The IPDL JPO Machine Translation for JP 08-171926 A (publication date Jul. 1996).*

* cited by examiner

*Primary Examiner*—Patrick Joseph Ryan
*Assistant Examiner*—Angela J. Martin
(74) *Attorney, Agent, or Firm*—Lahive & Cockfield LLP; Anthony A. Laurentano, Esq.

(57) ABSTRACT

A fuel cell stack capable of giving improved impact resistance and vibration resistance without causing the space occupied by the fuel cell stack to be increased. In a fuel cell stack for mounting in a vehicle in which a plurality of fuel cell units, each of which is formed by interposing a solid polymer electrolyte membrane between an anode electrode and a cathode electrode, are stacked in a horizontal direction with separators placed between each, mounting members used for installation are provided at backup plates that are outside fastening structure portions that are provided at both ends along the direction in which the fuel cell units are stacked, and an intermediate supporting member used for installation is additionally provided at an intermediate portion along the direction in which the fuel cell units are stacked.

5 Claims, 11 Drawing Sheets

FUEL CELL STACK

RELATED APPLICATIONS

This application claims priority to Japanese Patent Application No. P2000-275579 filed on Sep. 11, 2000 in Japan. The contents of the aforementioned application are hereby incorporated by reference.

BACKGROUND OF THE INVENTION

1. Field of the Invention

The present invention relates to a fuel cell stack for mounting in a vehicle. In this fuel cell stack a plurality of fuel cell units, each of which is formed by placing a solid polymer electrolyte membrane between an anode side electrode and a cathode side electrode, are stacked in the horizontal direction with separators placed therebetween. In particular, the present invention relates to a fuel cell stack having excellent vibration resistance and impact resistance.

2. Description of the Related Art

A solid polymer electrolyte fuel cell is formed, for example, by interposing between separators fuel cell units formed by providing an anode electrode on one side and a cathode electrode on the other side of an electrolyte membrane comprising a polymer ion exchange membrane (a cation exchange membrane). This solid polymer electrolyte fuel cell is normally used as a fuel cell stack by arranging a predetermined number of fuel cell units and separators in a stack.

In this type of fuel cell stack, fuel gas, for example, hydrogen gas supplied to the anode side electrode is hydrogen ionized on a catalytic electrode and moves towards the cathode side electrode via the electrolyte membrane that has been humidified to an appropriate degree. The electrons generated in the electrochemical reaction flow through an external circuit and can provide electric energy in the form of a direct current. Because an oxidizing gas such as oxygen gas or air is supplied to the cathode side electrode, the hydrogen ions, the electrons, and the oxygen gas react at the cathode side electrode to generate water.

When the above described fuel cell stack is employed by being mounted in a vehicle, in particular, a passenger vehicle, there are strict limitations on the space that can be taken up by the fuel cell stack in the height direction as a result of the stack commonly being placed under the floor of the vehicle compartment. Accordingly, the height of a fuel cell unit is restricted and a plurality of fuel cell units are stacked in the horizontal direction with separators placed in between each fuel cell unit (see Japanese Unexamined Patent Application, First Publication No. Hei-8-171926 for an example). The fuel cell stack is fixed to vehicle body panel by mounting members provided in end plates at both ends of the fuel cell stack.

An example of this structure can be seen in FIG. 13. In FIG. 13 the numeral 1 indicates a fuel cell stack. In this fuel cell stack 1, a plurality of fuel cell units, each of which is formed by placing a solid polymer electrolyte membrane between an anode side electrode and a cathode side electrode, are stacked in the horizontal direction with separators placed between each. Each fuel cell unit is fastened by a stud bolt 2. A fastening structure portion 3 comprising a coned disc spring or the like is provided at one end in the direction in which the fuel cell stack 1 is stacked, while another fastening structure portion 4 comprising a washer or the like is provided at the other end thereof. These two portions impart the necessary fastening force to each fuel cell unit of the power generating cell portion located in the center portion.

Here, a mounting member 6 used for the installation of the fuel cell stack 1 is mounted on an end plate 5 of the fastening structure member 3 provided at the one end in the stacking direction of the fuel cell units, while a mounting member 8 used for the installation of the fuel cell stack 1 is also mounted on a backup plate 7 of the fastening structure member 4 at the other end of the fuel cell stack 1.

The two mounting members 6 and 8 provided at the two ends of the fuel cell stack 1 are fixed to the vehicle body panel 9.

However, in the conventional fuel cell stack 1 the problem exists that if the stacking length of the stack is made longer due to the increasing number of fuel cell units as a result of attempts to raise the output voltage of the fuel cell stack 1, the natural frequency of the fuel cell stack 1 decreases resulting in deterioration of vibration resistance to vibration generated by repeated starting and stopping of the vehicle or while the vehicle is traveling or the like.

In addition, the problem also exists that if the stacking length of the stacking is made longer, because the distance between the center of gravity of the fuel cell stack 1 and the mounting members 6 and 8 (which are the support points) is lengthened, the load (particularly the moment) acting on the mounting members 6 and 8 provided at both ends of the fuel cell stack 1 increases. This results in the impact resistance when an impact force is applied to the vehicle being reduced.

In response to this, although it may also be possible to employ a greater number of fuel cell units each having a shorter stack length, because the stud bolts that fasten the fuel cell units stacked together via separators, the fastening structure portions, the manifold for supplying the fuel gas and the oxidizing gas and the like, the piping, the bus bars for the electrical connections, and the like are all additionally necessary, the number of parts as well as the number of assembly steps are greatly increased and the problem arises that this tends to cause an increase in the weight of the vehicle as well as in the space occupied by the fuel cell stack.

SUMMARY OF THE INVENTION

Therefore, it is an object of the present invention to provide a fuel cell stack that allows the vibration resistance and impact resistance to be improved without the space occupied by the fuel cell stack being increased.

In order to solve the above problems, the first aspect of the present invention is a fuel cell stack for mounting in a vehicle in which a plurality of fuel cell units (for example, the fuel cell units 14 of the embodiments), each of which is formed by interposing a solid polymer electrolyte membrane (for example, the solid polymer electrolyte membrane 11 of the embodiments) between an anode side electrode (for example, the anode side electrode 12 of the embodiments) and a cathode side electrode (for example the cathode side electrode 13 of the embodiments), are stacked in a horizontal direction with separators (for example the separators 15 and 16 of the embodiments) placed between each, wherein a mounting member (for example, the mounting members 25 and 26 of the embodiments) used for installation is provided at an end plate (for example, the end plate 20 and the backup plate 20A of the embodiments) that is provided at both ends along the direction in which the fuel cell units are stacked, and at least one intermediate supporting member (for example, the intermediate supporting member 28 of the embodiments) is additionally provided at an intermediate portion along the direction in which the fuel cell units are stacked.

By employing this structure, it is possible to shorten the distance between the center of gravity of the fuel cell stack and the support points using the intermediate supporting member and to thus lighten the load on the mounting members at both ends in the stacking direction of the fuel cell units. It also becomes possible to raise the natural frequency of the fuel cell stack by increasing the number of support points of the fuel cell stack.

According to the second aspect of the present invention, the intermediate supporting member is provided with a plate (for example, the plate 29 of the embodiments) that is inserted into an intermediate portion along the direction in which the fuel cell units are stacked, and with a mounting member (for example, the mounting member 30 of the embodiments) used for installation.

By employing this structure, it becomes possible to effectively utilize the stack structure of the fuel cell units and to fix the plate interposed between fuel cell units via the mounting members for mounting this plate.

According to the third aspect of the present invention, the plate (for example, the plate 62 of the embodiments) electrically connects together the fuel cell units situated on either side of the plate.

By employing this structure, in addition to the function of supporting the fuel cell stack, it is possible for the plate to make a reliable electrical connection between the fuel cell units on either side of the plate. As a result, there is no need to provide external wiring to make this electrical connection.

According to the fourth aspect of the present invention, the plate is provided with an insulating plate (for example, the insulating plate 42 of the embodiments) that insulates the fuel cell units situated on either side of the plate, and with terminal plates (for example, the terminal plates 44 of the embodiments) that sandwich the insulating plate and that are electrically connected by a pair of concavo-convex electrical connection terminals (for example, the terminals 43*a* and 43*b* of the embodiments) within the surface of the insulating plate.

By employing this structure, it is possible to ensure the electrical connection between adjacent fuel cell units via the terminal plates and, by using the insulating plate, it is possible to install a mounting member without needing to provide insulation for the mounting member.

According to the fifth aspect of the present invention, the intermediate supporting member is provided at a central portion along the direction in which the fuel cell units are stacked.

By employing this structure, it is possible to support the fuel cell stack in a balanced manner.

According to the sixth aspect of the present invention, the intermediate supporting member is a U shaped bracket (for example, the bracket 75 of the embodiments) that is positioned so as to surround an outer periphery of the fuel cell units.

By employing this structure, it becomes possible to add the intermediate supporting member to the fuel cell stack at a later stage thereby improving the ease of assembly. Furthermore, it is possible to shorten the length of the stack, as there is no need to interpose the plate in the intermediate portion along the stacking direction.

BRIEF DESCRIPTION OF THE DRAWINGS

Some of the features and advantages of the invention having been described, others will become apparent from the detailed description which follows, and from the accompanying drawings, in which.

DESCRIPTION OF THE PREFERRED EMBODIMENTS

The invention summarized above and defined by the enumerated claims may be better understood by referring to the following detailed description, which should be read with reference to the accompanying drawings. This detailed description of a particular preferred embodiments, set out below to enable one to build and use one particular implementation of the invention, is not intended to limit the enumerated claims, but to serve as a particular example of the invention.

Figure 1:
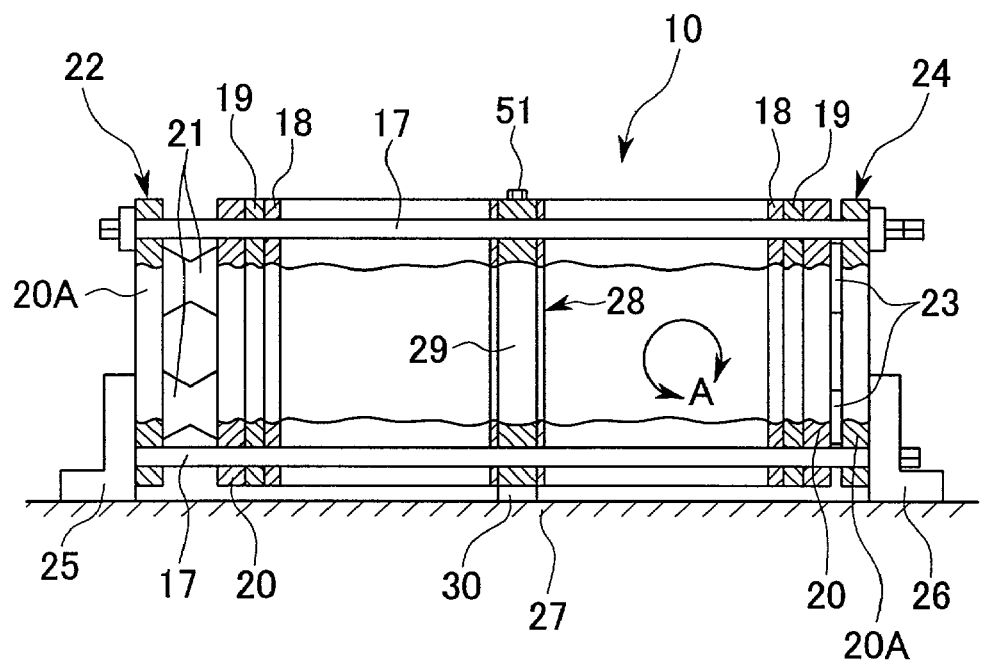
FIG. 1 is a typical front elevational view of the first embodiment of the present invention.
Figure 2:
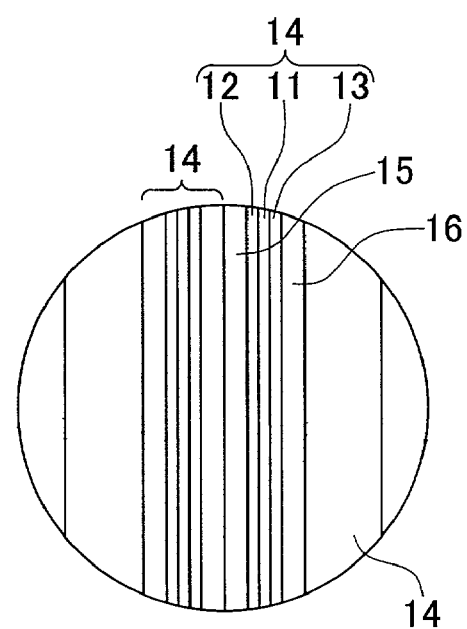
FIG. 2 is an enlarged view of portion A from FIG. 1.

FIG. 1 is a typical view showing the first embodiment of the present invention. In FIG. 1, the numeral 10 indicates a fuel cell stack for mounting in a vehicle. As is shown in FIG. 2, the fuel cell stack 10 is formed by stacking in the horizontal direction a plurality of fuel cell units 14 that are separated by separators 15 and 16. Each of the fuel cell units 14 is formed from a solid polymer electrolyte membrane 11 interposed between an anode side electrode 12 and a cathode side electrode 13. Hydrogen gas is supplied to the area between the anode side electrode 12 and the separator 15 that is adjacent thereto, while air is supplied to the area between the cathode side electrode 13 and the separator 16 that is adjacent thereto. Coolant is fed to flow passages between the rear surfaces of each of the separators 15 and 16 so that the fuel cell units 14 are cooled. In addition, in order to supply the above hydrogen gas, air, and cooling water, communicating holes (shown in FIG. 4) are provided that penetrate each of the fuel cell units 14 and the plate that is described below.

The stacked fuel cell units 14 are fastened by stud bolts 17 and terminal plates 18 are provided at both ends of the stacked body of single fuel cell unit 14. In addition, a fastening structure portion 22 is provided outside the terminal plate 18 at one end in the stacking direction with an insulating plate 19 placed in between. The fastening structure portion 22 comprises coned disc springs 21 interposed between an end plate 20 and a backup plate 20A. Outside the terminal plate 18 at the other end is provided a fastening structure portion 24 with an insulating plate 19 placed in between the two. The fastening structure portion 24 comprises an impact cushioning member (a washer) 23 interposed between an end plate 20 and a backup plate 20A. These two fastening structure portions 22 and 24 impart the necessary fastening force to each single fuel cell unit 14 of the power generating cell portion located in the center portion.

A mounting member 25 used for the installation of the fuel cell stack 10 is supported at the backup plate 20A of the fastening structure portion 22 at the one end, while a mounting member 26 used for installing the fuel cell stack is also provided in the same way at the backup plate 20A of the fastening structure portion 24 at the other end. The two mounting members 25 and 26 are fixed to the vehicle body panel 27.

Here, a description is given of an example in which the mounting members 25 and 26 are supported at the backup plates 20A of the fastening structure portions 22 and 24, however, it is also possible for the mounting members 25 and 26 to be supported at the end plates outside the terminal plates 18.

Note that the end plates referred to in the claims are the members outside the terminal plates 18, namely, the members forming both end portions in the stacking direction of the single fuel cell units 14. This naturally includes the end plate 20, the backup plate 20A outside the insulation plate 19, and any plates other than these.

An intermediate supporting member 28 used for installing the fuel cell stack is additionally provided between the locations where the two mounting members 25 and 26 are provided, more specifically, in the center portion in the direction in which the fuel cell units 14 are stacked. This intermediate supporting member 28 is provided with a plate 29 inserted in the center portion in the stacking direction of the fuel cell units 14 and with a mounting member 30 for the mounting of the plate 29.

Figure 3:
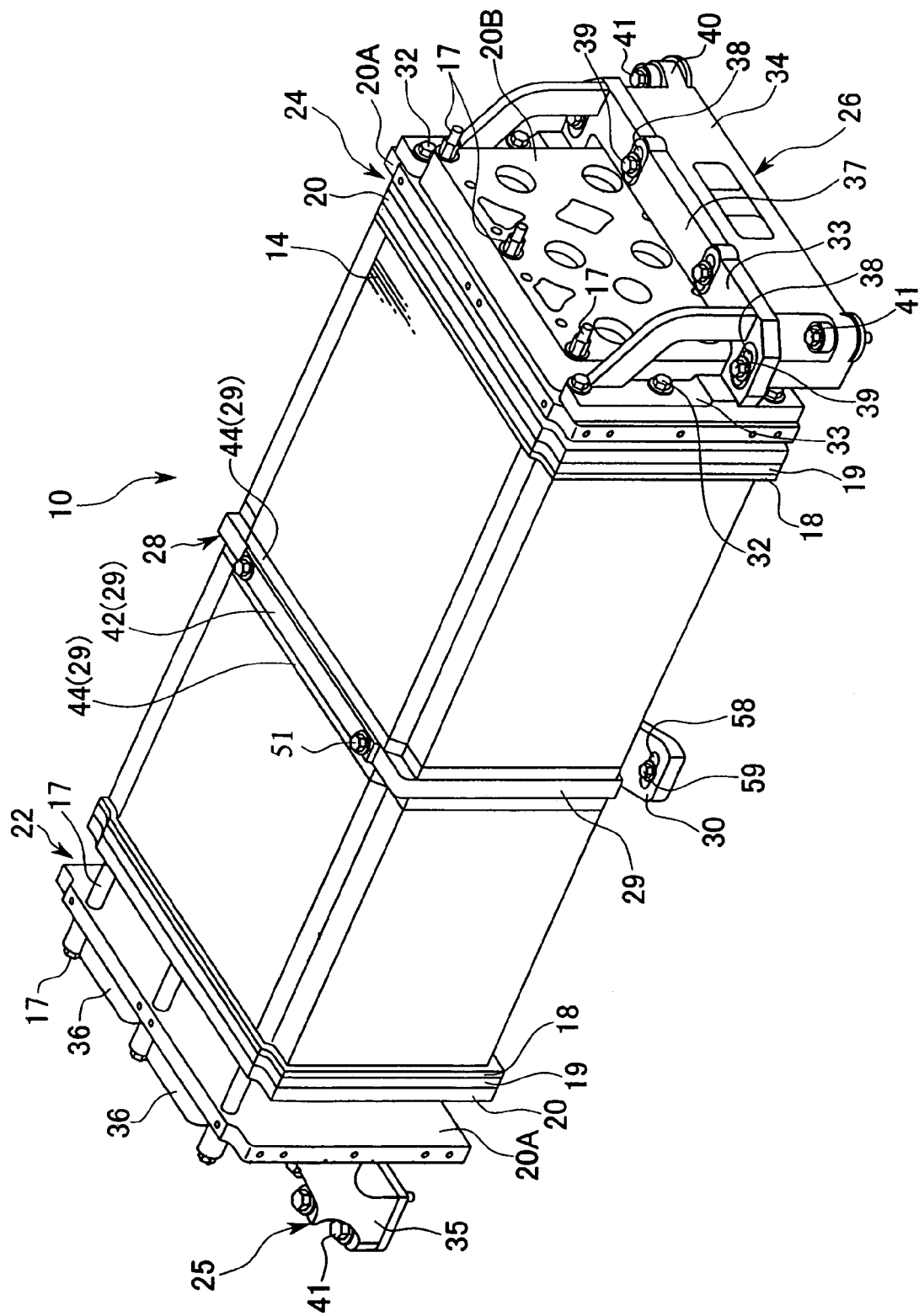
FIG. 3 is a perspective view of the first embodiment of the present invention.

A detailed description will now be given based on FIGS. 3 to 5 of the mounting members 25 and 26 and of the intermediate supporting member 28. Note that in the description the same numerals as those used in FIG. 1 are given to corresponding portions.

Figure 12:
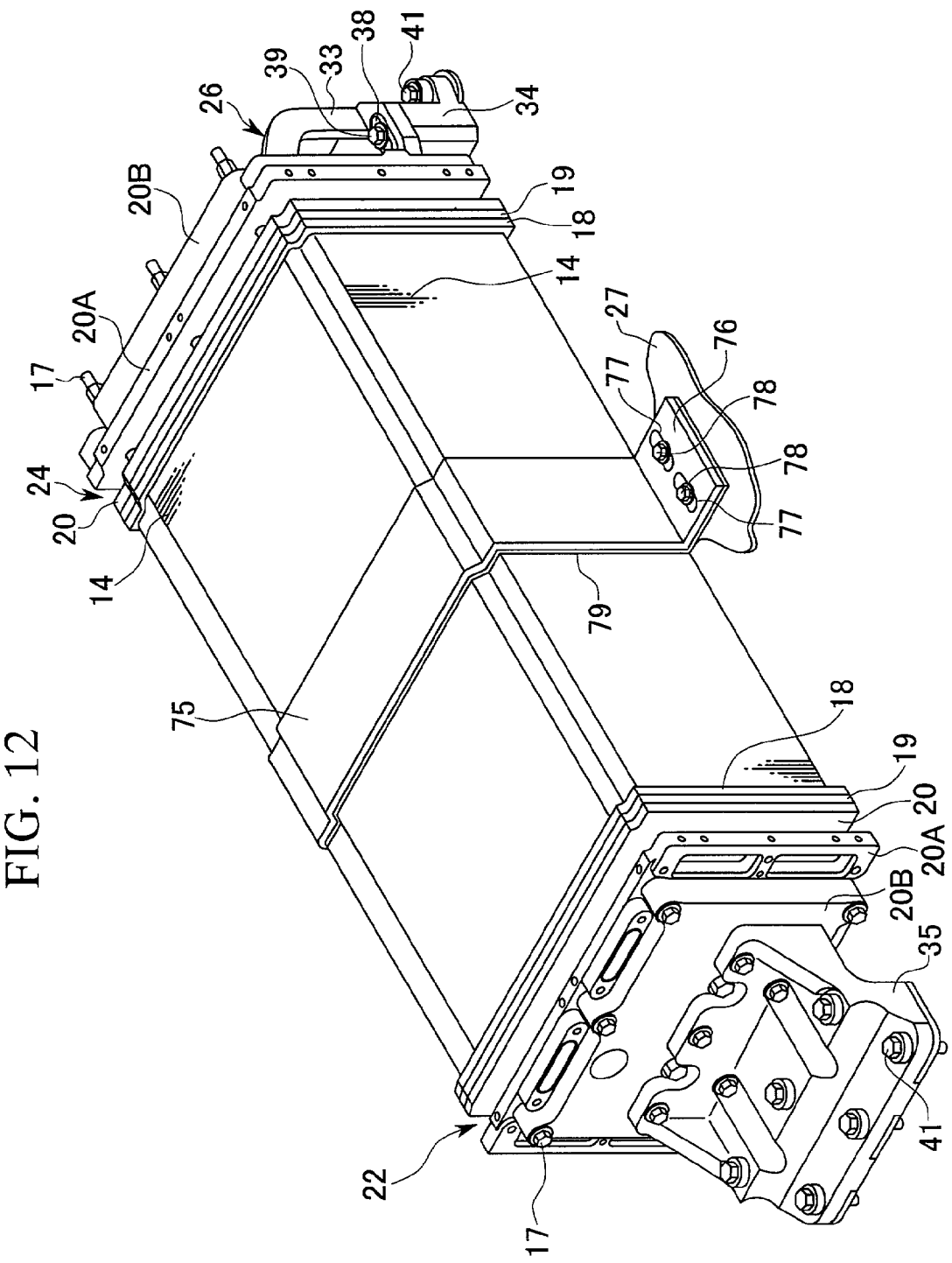
FIG. 12 is a perspective view of the fifth embodiment of the present invention.
Figure 13:
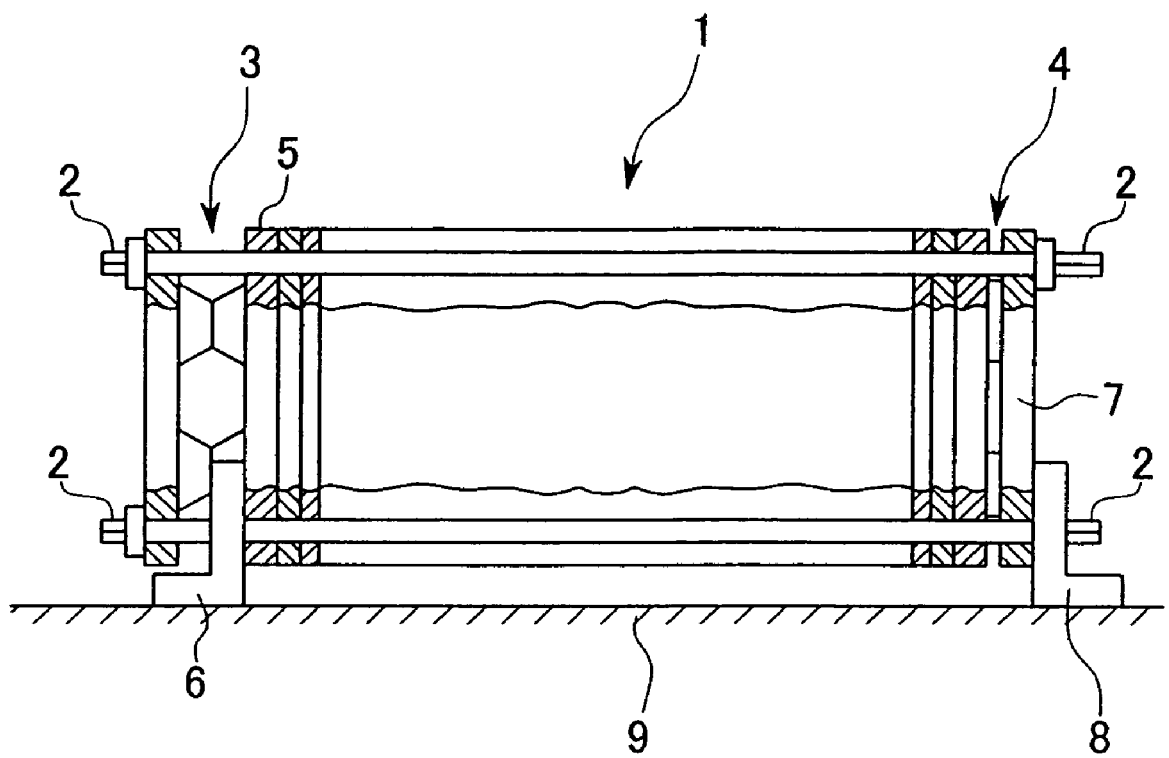
FIG. 13 is a typical front elevational view of the conventional technology.

The mounting members 25 and 26 are positioned at both ends in the stacking direction of the fuel cell units 14. As is shown in FIG. 3, the mounting member 26 provided at the backup plate 20A of the fastening structure portion 24 on the other end side of the fuel cell stack 10 (referred to below simply as "the other end") is formed from a base member 34 and a bracket 33, which is fixed by bolts 32, that is shaped so as to form a bridge over a convex portion 20B of the backup plate 20A. The mounting member 25 provided at the backup plate 20A of the fastening structure portion 22 of the one end side of the fuel cell stack 10 (referred to below simply as "the one end") is formed from a bracket 35 supported at the backup bracket 20A. Note that the structure of these portions is the same as is shown in FIG. 12 described below.

Here, piping mounting bases 36 used for the communicating holes described below are provided at the backup plate 20A of the fastening structure portion 22 at the one end.

A horizontally formed mounting plate 37 is provided at the bracket 33 of the mounting member 26 mounted on the fastening structure portion 24 of the other end. Elongated holes 38 that are elongated in the longitudinal direction of the fuel cell stack 10 are formed in the mounting surface 37.

A base member 34 of the mounting member 26 mounted on the other end fastening structure portion 24 is provided so as to extend along the mounting surface 37 of the bracket 33. The base member 34 is provided with a mounting portion 40 used when mounting the fuel cell stack onto the vehicle body panel 27, and with unillustrated threaded portions that mesh with fastening bolts inserted through the elongated holes 38 of the bracket 33.

Here, the mounting portion 40 for mounting onto the vehicle body panel is mounted onto the vehicle body panel 27 using the fixing bolts 41. Note that because a type of piping (not illustrated) is connected to the backup plate 20A on the side of the mounting member 25 of the fastening structure portion 22 of the one end, namely, on the bracket 35 side, the bracket 35 is fixed rigidly by the fixing bolts 41 to the vehicle body panel 27.

As was described above, the intermediate supporting member 28 is interposed at the center portion in the stacking direction of the fuel cell units 14. As is shown in FIGS. 4 and 5, the intermediate supporting member 28 is provided with a plate 29 and with mounting members 30 used when mounting the plate 29 to the vehicle body panel 27. Note that, in FIG. 4, the hatching of the mounting member 30 is omitted in order to clarify the drawing.

The plate 29 is provided with an insulating plate 42 formed, for example, from resin that insulates the fuel cell units 14 positioned on both sides thereof, and with terminal plates 44 that sandwich the insulating plate 42 and that are electrically connected by a pair of concavo-convex electrical connection terminals 43a and 43b within the surface of the insulating plate 42. Note that, for reasons of convenience, FIGS. 4 and 5 show a state in which the insulating plate 42 is interposed between the terminal plates 44.

Figure 4:
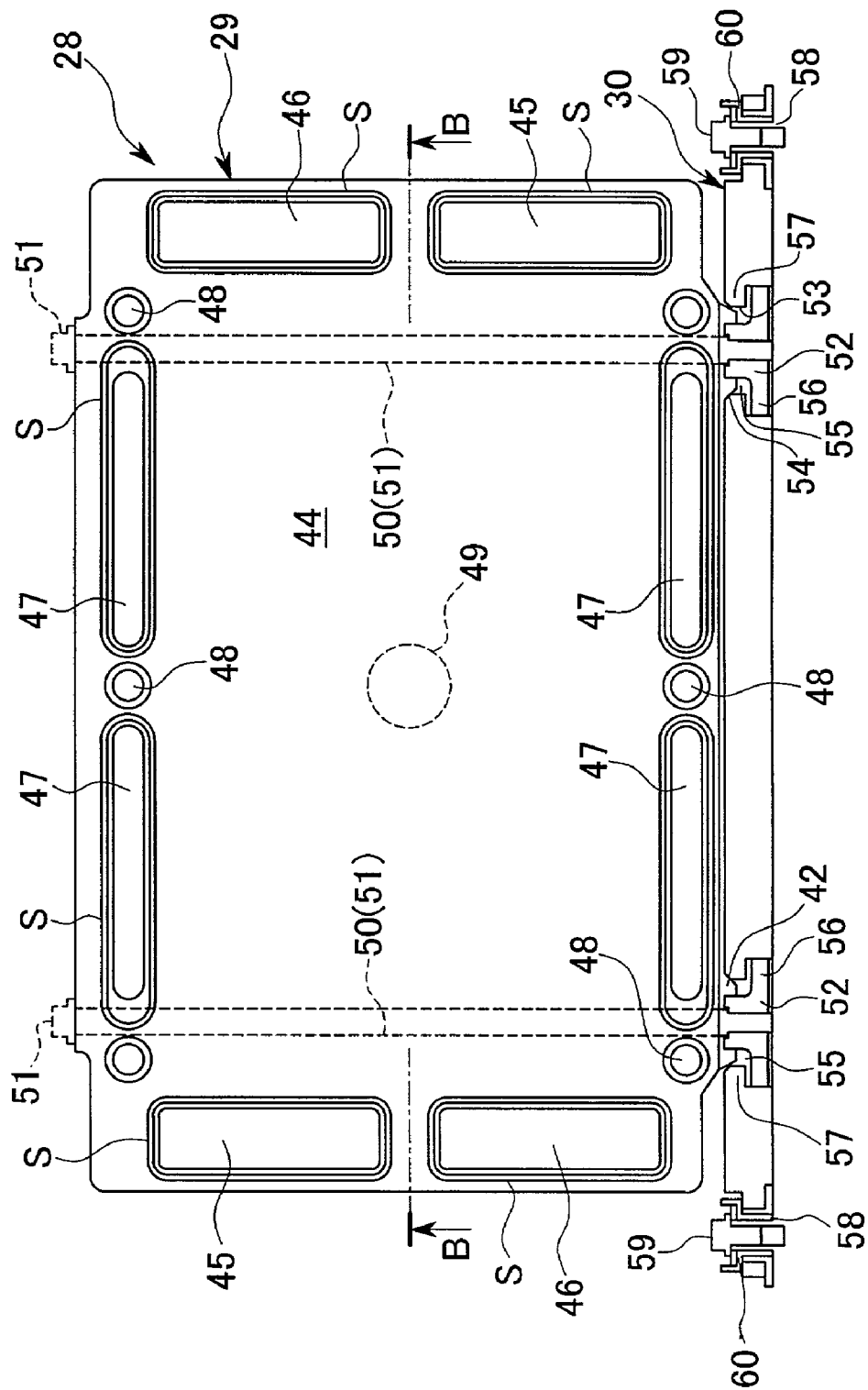
FIG. 4 is a plan view of the intermediate supporting member of the first embodiment of the present invention.

As is shown in FIG. 4, communicating holes 45 for the supply and discharge of hydrogen gas and communicating holes 46 for the supply and discharge of air are formed at the top and bottom of both ends in the transverse direction of the insulating plate 42 and the terminal plates 44. Communicating holes 47 for the supply and discharge of coolant are also formed at the top and bottom of each of the plates 42 and 44. In addition, communicating holes 48 for the stud bolts 17 are formed adjacent to the coolant communicating holes 47.

Here, sealing material S is attached to the periphery of the communicating holes 45, 46, and 47 on the terminal plates 44.

Figure 5:
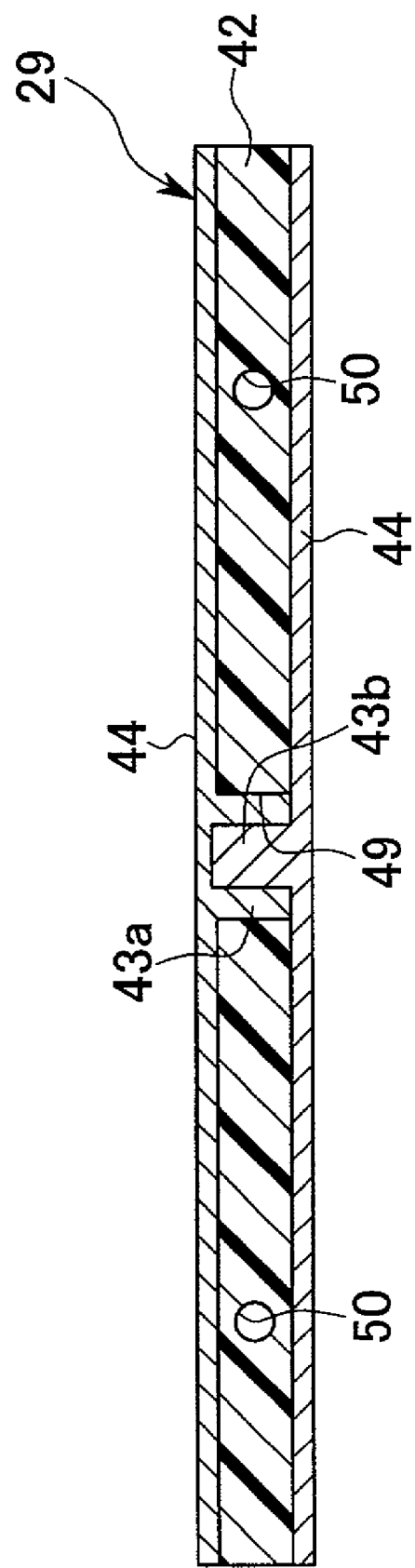
FIG. 5 is a cross sectional view taken along the line B—B in FIG. 4.

As is shown in FIG. 5, the terminal plates 44 electrically connect with the separators 15 and 16 adjacent to each. In one terminal plate 44 is formed a concave shaped terminal 43a, while in the other terminal plate 44 is formed a convex shaped terminal 43b. Each terminal 43a and 43b is formed at a position corresponding to a hole 49 formed in the center portion of the insulating plate 42. The concave shaped terminal 43a and the convex shaped terminal 43b fit together inside the hole 49 in the insulating plate 42 thereby electrically connecting the two separators 15 and 16. Note that the bottom edges of the terminal plates 44 are slightly above the bottom edge of the insulating plate 42 so as to avoid being connected electrically with the mounting member 30.

In addition, through holes 50 are formed in two locations in the insulating plate 42 in the vertical direction in FIGS. 4 and 5. Fastening bolts 51 are inserted into these through holes 50 and are fixed in place by being fastened to nuts 52 of the mounting member 30 that is described below. Here, a tapered portion 54 that is supported in a guide hole 53 of the mounting member 30 described below is formed at the periphery of the bottom end of the through hole 50 of each fastening bolt 51.

The mounting member 30 is manufactured from metal and supports the insulating plate 42 at the bottom of the insulating plate 42. Attachment holes 55 are provided at positions corresponding to the tapered portions 54 of the insulating plate 42 and the nuts 52 that mesh with the fastening bolts 51 are attached here. An anchoring portion 56 is provided on the bottom of each nut 52 so that the nut 52 is not lifted up out of the attachment hole 55. The anchoring portion 56 is held in place by a collar portion 57 provided at the upper peripheral edge of the attachment hole 55.

Elongated holes 58 (see FIG. 3) are also formed in both end portions of the mounting member 30. Fastening bolts 59 that are fastened to the vehicle body panel 27 are inserted through these elongated holes 58. Note that, as is shown in FIG. 4, a collar 60 formed from an insulating material and provided with a flange is provided at the periphery of the fastening bolt 59. This collar 60 assists the insulating plate 42 in providing reliable insulation from the vehicle body panel 27. Note also that an insulation processing is also performed on the vehicle body panel 27. Here, the elongated holes 58 in the mounting member 30 are intended, together with the elongated holes 38 in the mounting surface 37 of the bracket 33, to allow contraction and expansion to occur in the stacking direction as a result of heat from the fuel cell stack 10. Accordingly, it is possible to prevent stress from being generated by thermal expansion and contraction of the fuel cell stack 10 such as would be the case if the fuel cell stack 10 that is made to expand and contract by heat were fixed rigidly.

According to the above embodiment, the distance between the support points and the center of gravity of the fuel cell stack 10 is shortened due to the intermediate supporting member 28. Namely, as the center of gravity of the fuel cell stack 10 is at some location of the power generating cell portion, the intermediate supporting member 28 gives greater support to the vicinity of the center of gravity than do the mounting members 25 and 26 situated at both ends in the stacking direction of the fuel cell units 14. Accordingly, it is possible to lighten the load on the mounting members 25 and 26 situated at both ends in the stacking direction of the fuel cell units 14 by that same amount of support, and it is also possible to heighten the natural frequency of the fuel cell stack 10 by increasing the number of support points of the fuel cell stack 10. As a result, it is possible to increase the impact resistance by ensuring sufficient support rigidity when an impact is applied to the vehicle.

In addition, because it is possible to increase the number of support points of the fuel cell stack 10 and to raise the natural frequency of the fuel cell stack 10, it becomes possible to increase the vibration resistance against vibration created while the vehicle is traveling or by repeated starting and stopping of the vehicle.

Moreover, because the intermediate supporting member 28 is provided with a mounting member 30 used for installation and with a plate 29 that is inserted in the intermediate portion in the stacking direction of the fuel cell units 14, it becomes possible to effectively utilize the stack structure of the fuel cell units 14 and to fix the plate 29 inserted between fuel cell units 14 via the mounting member 30. As a result, it becomes possible to reliably divide the load using the plate 29 that is fixed solidly by the stud bolts 17 between the fuel cell units 14.

Furthermore, because the plate 29 is provided with an insulating plate 42 that insulates the fuel cell units 14 positioned on both sides thereof, and with terminal plates 44 and 44 that sandwich the insulating plate 42 and that are electrically connected by a pair of concavo-convex electrical connection terminals 43a and 43b within the surface of the insulating plate 42, it is possible to ensure the electrical connection between adjacent fuel cell units 14 via the terminal plates 44 and 44, and by using the insulating plate 42 it is possible to install the mounting member 30 without having to provide insulation between the plate 29 and the mounting member 30.

Accordingly, it is possible to lower the installation height by the amount gained by not providing an insulating member between the plate 29 and the mounting member 30. As a result, when the fuel cell stack 10 is to be used in a vehicle and housed under the floor, the space inside the vehicle compartment can be increased by this same amount. Moreover, because the intermediate supporting member 28 is positioned in the center portion in the stacking direction of the fuel cell units 14, the fuel cell stack 10 can be supported with good balance provided that the weights of the fastening structure portions 22 and 24 are balanced. As a result, it is possible to stably support the fuel cell stack 10.

Figure 6:
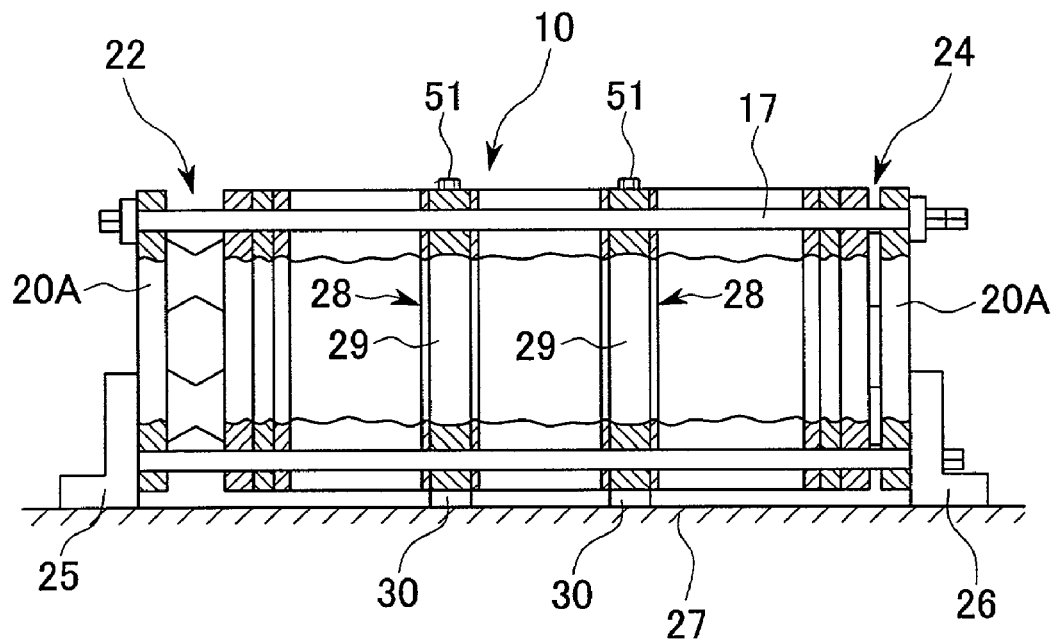
FIG. 6 is a typical front elevational view showing another form of the first embodiment of the present invention.

Next, FIG. 6 is a typical view showing the structure when two of the intermediate supporting members 28 of the above embodiment are provided in another form of the first embodiment of the present invention. Note that those portions that are the same as in FIG. 1 are given the same descriptive numerals and a description thereof is omitted.

According to this form, the divided load at each support point is further lessened by the mounting members 25 and 26 provided at the two ends and the two intermediate supporting members 28 and 28. As a result, the vibration resistance and the impact resistance are improved and it is possible to provide even more stable support for the fuel cell stack 10.

Figure 7:
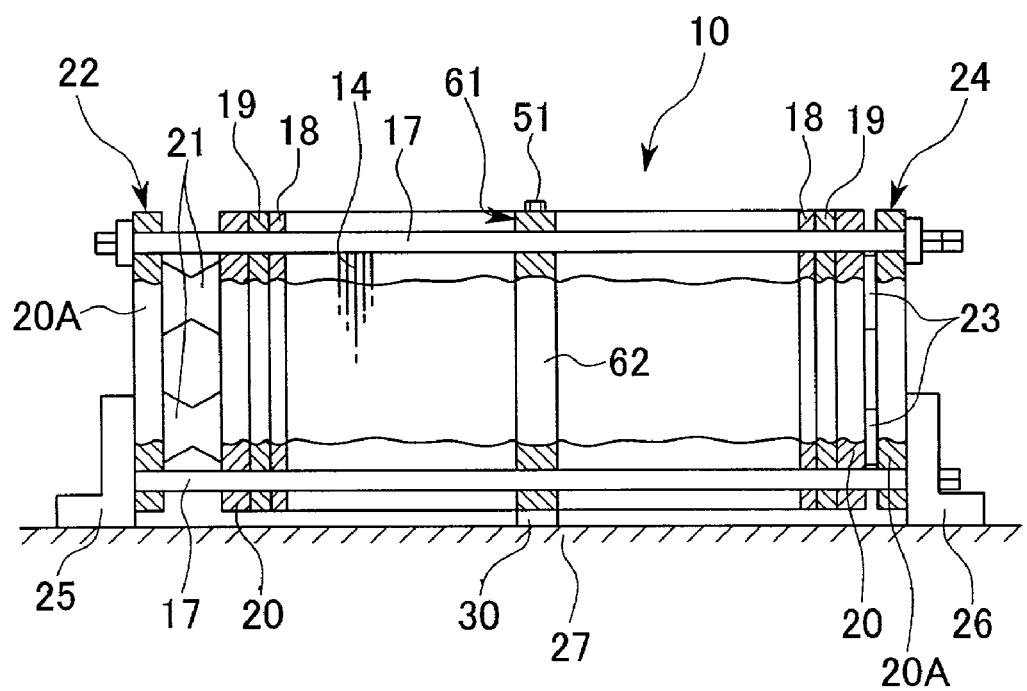
FIG. 7 is a typical front elevational view of the second embodiment of the present invention.
Figure 8:
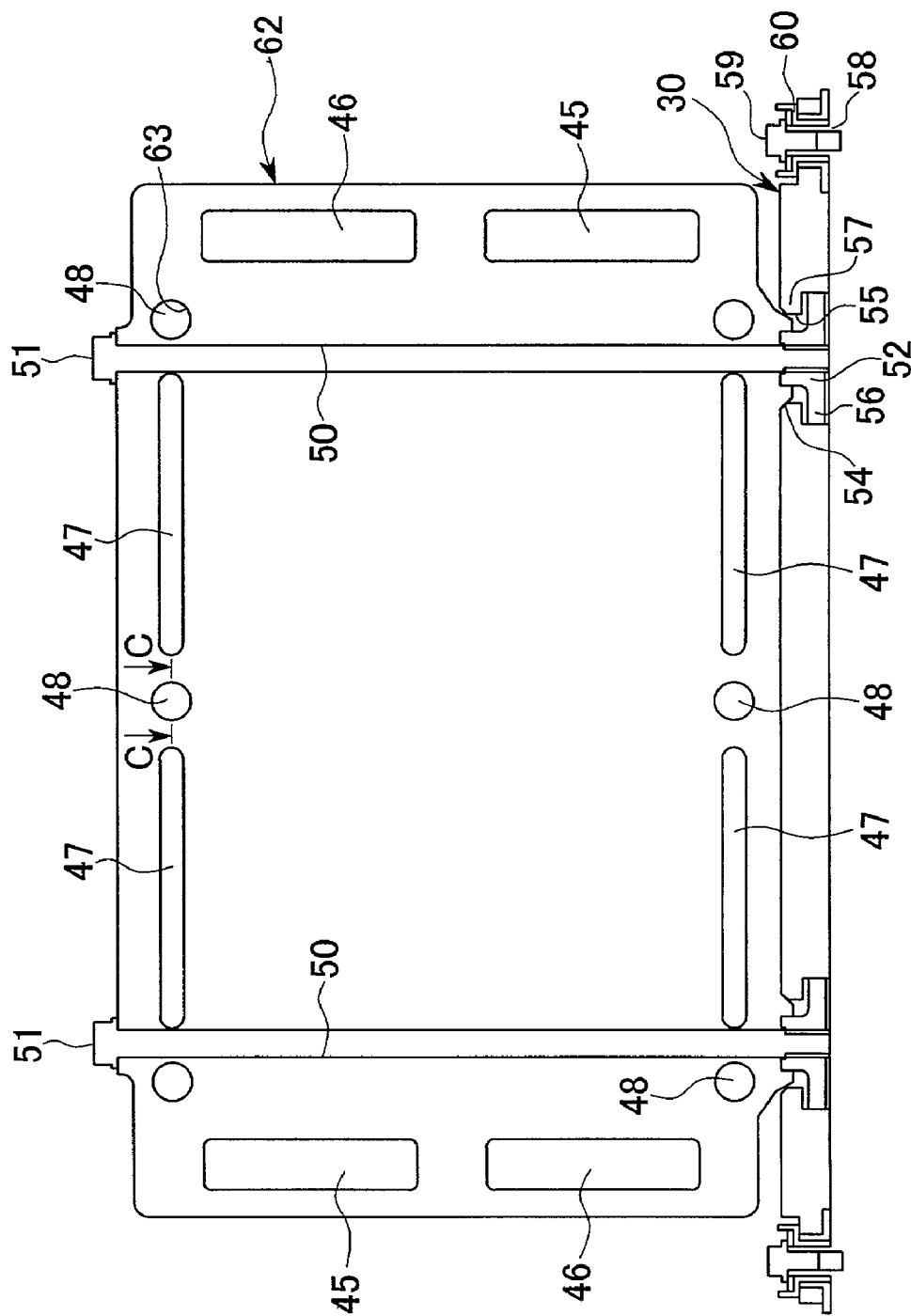
FIG. 8 is a front cross sectional view of the intermediate supporting member of the second embodiment of the present invention.
Figure 9:
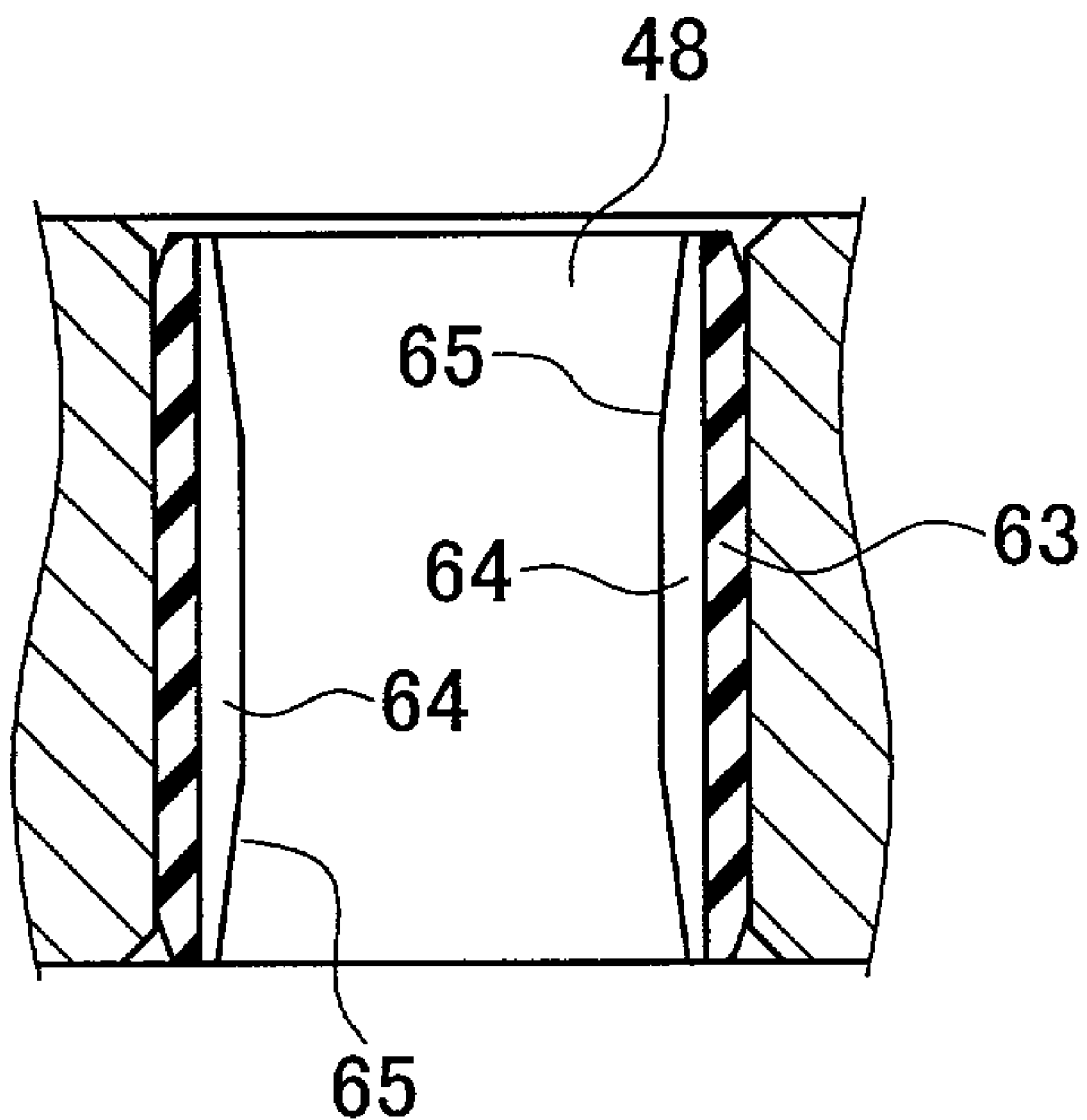
FIG. 9 is a cross sectional view taken along the line C—C in FIG. 8.

FIGS. 7 to 9 show the second embodiment of the present invention. Because this embodiment is the same as the above embodiments apart from the plate of the intermediate supporting member being different, the same descriptive numerals are given to the same portions and a repeated description thereof is omitted.

The intermediate supporting member 61 in the present embodiment is interposed at a central portion in the stacking direction of the fuel cell units 14 in the same way as in the first embodiment and, as is shown in FIG. 8, is provided with a flat plate 62 manufactured from metal and a mounting member 30 for installing the fuel cell stack 10 that is used to mount the plate 62 on the vehicle body panel 27. Note that because the mounting member 30 has the same structure as that described in the above embodiment the same descriptive numerals are given to the same portions and a description thereof is omitted here.

As is shown in the cross sectional view in FIG. 8, communicating holes 45 for the supply and discharge of hydrogen gas and communicating holes 46 for the supply and discharge of air are formed at the top and bottom of both ends in the transverse direction of the plate 62. Communicating holes 47 for the supply and discharge of coolant are also formed at the top and bottom of the plate 62. In addition, communicating holes 48 for the stud bolts 17 are formed adjacent to the coolant communicating holes 47.

Here, as is shown in FIG. 9, supporting rubber 63 is provided at the periphery of the insertion holes 48 in the plate 62 for the stud bolts 17 to serve as an insulating member for preventing electrical short circuits. A plurality of elastic ribs 64 are formed on the supporting rubber 63 running in the insertion direction along the inner periphery of the holes. Tapered portions 65 are provided on the elastic ribs 64 that are formed so that the inner diameter of each insertion hole 48 becomes larger the closer to the two openings of each insertion hole 48. As a result, it is possible to elastically support the stud bolts 17 by the tapered portions 65 and the elasticity of the elastic ribs 64 themselves. In addition, the smooth insertion of the stud bolts 17 is made possible. Note that the peripheries of each of the insertion holes 45, 46, and 47 are sealed by an unillustrated sealing material that is provided at the peripheries of adjacent separators 15 and 16 in the same way as for the plate 29 in the above embodiments.

In the plate 62, the peripheries of the communicating holes 45, 46, and 47 are sealed by sealing material (not illustrated) between adjacent separators 15 and 16 as was described above. In addition, the plate contacts the surfaces of the separators 15 and 16 and by itself electrically connects two fuel cell units 14. Moreover, through holes 50 are formed in two locations in the plate 62 in the vertical direction. Fastening bolts 51 are inserted into these through holes 50 and are fixed in place by being fastened to nuts 52 of the mounting member 30. Here, a tapered portion 54 that is supported in a guide hole 53 of the mounting member 30 is formed at the periphery of the bottom end of the through hole 50 for each fastening bolt 51.

It is also possible in this embodiment to support the central portion of the fuel cell stack 10 using the intermediate supporting member 61 and to reduce the load on the mounting member 30 from both ends in the stacking direction of the fuel cell units 14 by the same amount as the load division obtained via the intermediate supporting member 61. By adding to the number of support points of the fuel cell stack 10, it is also possible to raise the natural frequency of the fuel cell stack 10. As a result, it is possible to increase the impact resistance by ensuring sufficient support rigidity when an impact is applied to the vehicle.

In addition, because it is possible to increase the number of support points of the fuel cell stack 10 and to raise the natural frequency of the fuel cell stack 10, it becomes possible to increase the vibration resistance to vibration created while the vehicle is traveling or by repeated starting and stopping of the vehicle.

Moreover, because the intermediate supporting member 61 is provided with a mounting member 30 used for installation and with a plate 62 that is inserted in the intermediate portion in the stacking direction of the fuel cell units 14, it becomes possible to effectively utilize the stack structure of the fuel cell units 14 and to fix the plate 62 inserted between fuel cell units 14 via the mounting member 30 for this plate 62. As a result, it becomes possible to reliably divide the load using the plate 62 that is fixed solidly between the fuel cell units 14.

Furthermore, because the plate 62 by itself is able to reliably connect the fuel cell units 14 electrically, there is no need to provide an insulating member on both sides. Therefore, it is possible to reduce the dimensions of the fuel cell stack 10 in the thickness direction thereof resulting in the length of the fuel cell stack 10 in the stacking direction thereof also being able to be made shorter.

Accordingly, when the fuel cell stack 10 is to be used in a vehicle, the present embodiment has the merit of being able to shorten the length thereof in the longitudinal direction. Moreover, because the intermediate supporting member 61 is positioned in the center portion in the stacking direction of the fuel cell units 14, the fuel cell stack 10 can be supported with good balance provided that the weights of the fastening structure portions 22 and 24 are balanced. As a result, it is possible to stably support the fuel cell stack 10 in the same way as in the above embodiments.

In addition, because the plate 62 directly connects together electrically the two fuel cell units 14 positioned on either side thereof, in addition to the support function of the fuel cell stack 10, it is possible to make a reliable mechanical connection between the two fuel cell units 14 sandwiching the plate 62.

Figure 10:
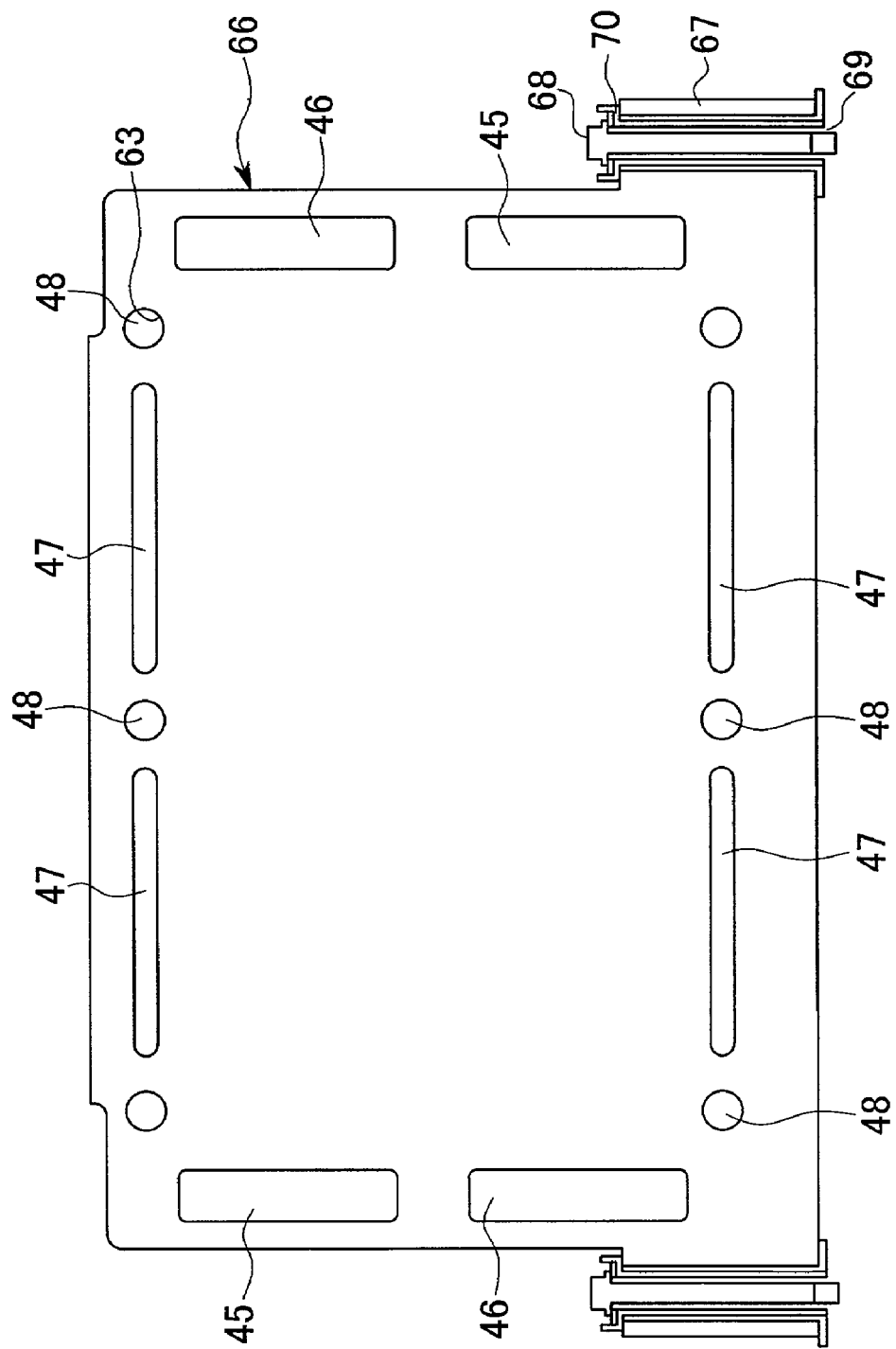
FIG. 10 is a front cross sectional view of the intermediate supporting member of the third embodiment of the present invention.

Next, the third embodiment of the present invention will be described on the basis of FIG. 10. In this embodiment, an improved plate (intermediate supporting member) 66 is employed instead of the plate 62 of the above embodiment.

Mounting portions 67 that project outwards at the bottom portions on both sides are formed on the plate 66. Through holes 69 for fastening bolts 68 that are shorter than the above described fastening bolts 51 are formed in the mounting portions 67. Namely, the mounting member 30 and the plate 62 in the above embodiment have been formed as a single unit. In addition, a collar 70 formed from an insulating material is inserted into the through holes 69 and the fastening bolts 68 are then inserted inside the collars 70.

Accordingly, in the present embodiment, in addition to the effects obtained in the above embodiments, it is possible to reduce the number of parts and also the number of assembly steps by integrating the mounting member 30 and the plate 62 of the above embodiment to form the plate 66. This structure also has the merit of simplifying the task of inserting the fastening bolts 68 by the amount these have been made shorter.

Note also that because the basic structure in the present embodiment such as the forming of the communicating holes 45 used for supplying and discharging hydrogen gas and the communicating holes 46 used for supplying and discharging air, the forming of the communicating holes 47 used for the supply and discharge of coolant, the forming of the communicating holes 48 used for the stud bolts 17 that are located adjacent to the coolant communicating holes 47, and the providing of the support rubber 63 at the periphery of the communicating holes 48 for the stud bolts 17 in the plate 66 in order to prevent electrical short circuiting is the same as in the above embodiments, the same descriptive numerals are given to the same portions and a description thereof is omitted.

Figure 11:
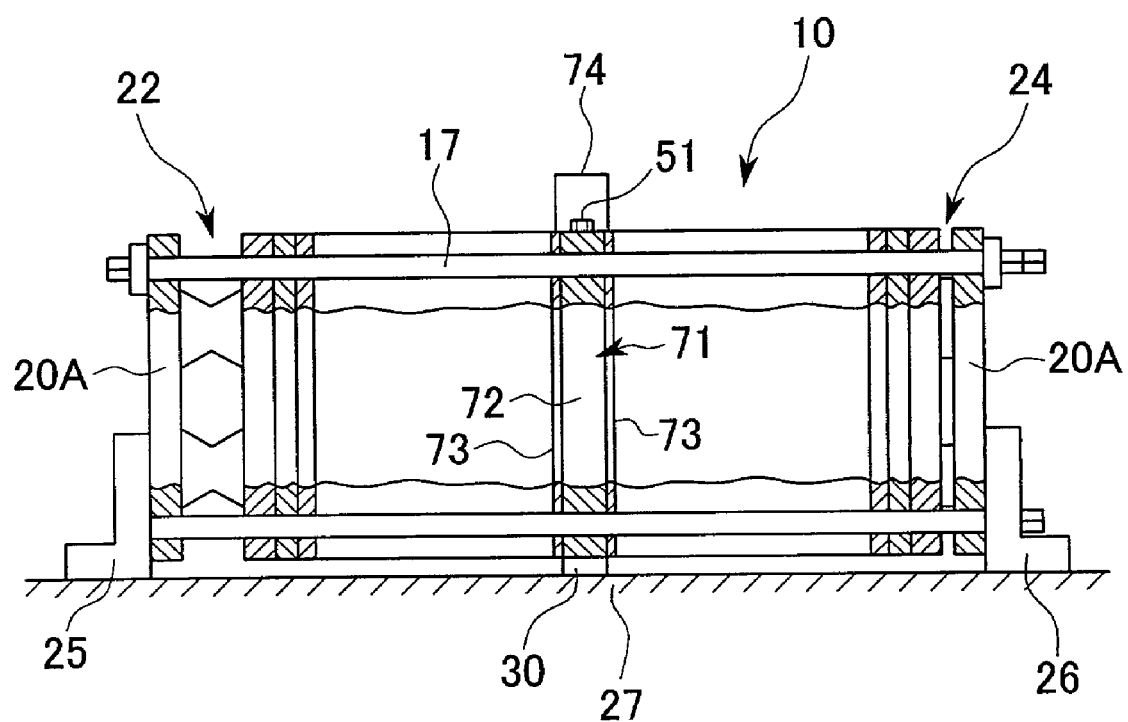
FIG. 11 is a typical front elevational view of the fourth embodiment of the present invention.

Next, the fourth embodiment of the present invention will be described on the basis of FIG. 11.

In this embodiment, the intermediate supporting member 71 is formed from a mounting member 30 and insulating plate 72 that resembles the insulating plate 42 of the first embodiment and the insulating plate 72 is interposed between terminal plates 73. Holes for the insertion of the convex and concave shaped terminals such as those in the abode described embodiment are not provided in the insulating plate 72. Instead, the terminal plates 73 are connected by a joining wire 74. Note that because the remainder of the structure is the same as in the first embodiment, the same descriptive numerals are given to the same portions and a description thereof is omitted.

As in the first embodiment, because it is possible in this embodiment as well to support the central portion of the fuel cell stack 10 using the insulating plate 72 and the mounting portions 30, it is possible to increase the impact resistance by ensuring sufficient support rigidity when an impact is applied to the vehicle. In addition, because it is possible to increase the number of support points of the fuel cell stack and to raise the natural frequency of the fuel cell stack, it becomes possible to increase the vibration resistance to vibration created while the vehicle is traveling or by repeated starting and stopping of the vehicle.

Next, a description will be given of the fifth embodiment of the present invention based on FIG. 12. Note that those portions that are the same as in the first embodiment are given the same descriptive numerals.

In the fuel cell stack 10 in the present embodiment, there is no member whatsoever interposed between the stacked fuel cell units 14 to form an intermediate support member.

Also in this embodiment, a terminal plate 18 is provided at both ends of the stack of fuel cell units 14. A fastening structure portion 22 is provided outside the terminal plate 18 at one end with an insulating plate 19 placed in between. The fastening structure portion 22 comprises unillustrated coned disc springs interposed between an end plate 20 and a backup plate 20A.

Outside the terminal plate 18 at the other end is provided a fastening structure portion 24 with an insulating plate 19 placed in between the two. The fastening structure portion 24 comprises an unillustrated impact cushioning member (a washer) interposed between an end plate 20 and a backup plate 20A.

A bracket (i.e. mounting member) 35 used for installing the fuel cell stack via the convex portion 20B thereof is provided at the backup plate 20A of the fastening structure member 22 at one end, while a mounting member 26 used for installing the fuel cell stack is provided at the backup plate 20A of the fastening structure member 24 at the other end. Note that the bracket 35 is fixed to the vehicle body panel 27 by fixing bolts 41.

Here, the intermediate supporting member in the present embodiment is a U shaped bracket 75 provided so as to surround the outer periphery of the fuel cell units 14. This bracket 75 is mounted to the center portion in the stacking direction of the power generating portion. Mounting portions 76 are provided at the bottom portion of both ends of the bracket 75 and, for example, two elongated holes 77 that extend in the stacking direction of the fuel cell units 14 are formed in the mounting portion 76. Fastening bolts 78 are inserted in these elongated holes 77. Here, an insulating plate 79 is inserted at the inner side of the bracket 75, namely, at the surface thereof that would otherwise be in contact with the fuel cell units 14. The mounting portions 76 of the bracket 75 are able to be mounted onto the vehicle body panel 27 that has undergone insulation processing. Note that, in FIG. 12, the structure of the other end of the fuel cell stack 10 which is not visible in the drawing is the same as is shown in FIG. 3.

Accordingly, in the same way as in the first embodiment, in the present embodiment as well, because the center portion of the fuel cell stack 10 can be supported by the bracket 75, it is possible to increase the impact resistance by ensuring sufficient support rigidity when an impact is applied to the vehicle. In addition, because it is possible to increase the number of support points of the fuel cell stack 10 and to raise the natural frequency of the fuel cell stack 10, it becomes possible to increase the vibration resistance to vibration created while the vehicle is traveling or by repeated starting and stopping of the vehicle.

Moreover, because it is possible to add brackets 75 at a later stage to the fuel cell stack 10, there is no need for a special supporting structure in the fuel cell stack 10 itself. Therefore, this structure has the merit of being greatly simplified Moreover, because only a comparatively thin member is required, any increase in weight can be kept in check and the height dimensions of the fuel cell stack 10 can also be controlled. In addition, the present structure is also effective in that, compared to the embodiments in which a plate is inserted, the lengthwise dimensions can be shortened allowing the necessary installation space to be reduced.

Note that the present invention is not limited to the above described embodiments and it is possible, for example, for the present invention to be applied to a fuel cell stack in which no fastening structure portion is provided. It is also possible for the number of locations where intermediate supporting members are installed to be increased to three or more.

As has been described above, according to the first aspect of the present invention, because it is possible to shorten the distance between the center of gravity of the fuel cell stack and the support points using the intermediate supporting member and to thus lighten the load on the mounting members at both ends in the stacking direction of the fuel cell units, the effect is obtained that it is possible to increase the impact resistance and ensure sufficient support rigidity when the vehicle receives an impact. Because it also becomes possible to increase the number of support points of the fuel cell stack and raise the natural frequency of the fuel cell stack, the effect is achieved that it becomes possible to increase the vibration resistance to vibration created while the vehicle is traveling or by repeated starting and stopping of the vehicle.

According to the second aspect of the present invention, in addition to the effects of the first aspect, because it is possible to effectively utilize the stack structure of the fuel cell units and to fix the plate interposed between fuel cell units via the mounting members for mounting this plate, the effect is achieved that it is possible to reliably divide the load via the plate that is firmly fixed between fuel cell units.

According to the third aspect of the present invention, in addition to the effects of the second aspect, because in addition to the function of supporting the fuel cell stack, it is possible for the plate to make a reliable electrical connection between the fuel cell units on either side of the plate, the effect is achieved that there are no deleterious effects on the electrical connections between the fuel cell units.

According to the fourth aspect of the present invention, in addition to the effects of the second aspect, because it is possible to ensure the electrical connection between adjacent fuel cell units via the terminal plates and because, by using the insulating plate, it is possible to install a mounting member without needing to provide insulation for the mounting member, the effect is achieved that it is possible to lower the installation height by the same amount that is gained by not providing the insulation member between the fuel cell stack and the mounting member.

According to the fifth aspect of the present invention, in addition to the effects of the first to fourth aspects, because it is possible to support the fuel cell stack in a balanced manner, the effect is achieved that it is possible to provide stable support for the fuel cell stack.

According to the sixth aspect of the present invention, in addition to the effects of the first or second aspects, because it is possible to add the intermediate supporting member to the fuel cell stack at a later stage, the effect is achieved that there is no need for a special supporting structure in the fuel cell stack itself.

Having thus described exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A fuel cell stack for mounting in a vehicle in which a plurality of fuel cell units, each of which is formed by interposing a solid polymer electrolyte membrane between an anode electrode and a cathode electrode, are stacked in a horizontal direction with separators placed between each fuel cell unit, comprising:

a mounting member for installation of the fuel cell into the vehicle provided at an end plate that is provided at both ends along the direction in which the fuel cell units are stacked, at least one intermediate supporting member additionally provided at an intermediate portion along the direction in which the fuel cell units are stacked for supporting the fuel cell stack in the vicinity of the intermediate portion, and at least one piping mounting member to which pipes for fuel gas, oxygen gas and coolant are attached, said piping mounting member being provided at at least one end of said fuel cell stack, wherein the intermediate supporting member comprises a plate that is inserted into an intermediate portion of the fuel cell stack along the direction in which the fuel cell units are stacked and a mounting member for mounting the plate of the intermediate supporting member to the vehicle, and wherein the plate of the intermediate supporting member electrically connects together the fuel cell units situated on either side of the plate of the intermediate supporting member.

2. The fuel cell stack according to claim 1, wherein the intermediate supporting member is provided at a central portion of the fuel cell stack along the direction in which the fuel cell units are stacked.

3. A fuel cell stack for mounting in a vehicle in which a plurality of fuel cell units, each of which is formed by interposing a solid polymer electrolyte membrane between an anode electrode and a cathode electrode, are stacked in a horizontal direction with separators placed between each fuel cell unit, comprising:

a mounting member used for installation of the fuel cell stack provided at an end plate that is provided at both ends along the direction in which the fuel cell units are stacked, and at least one intermediate supporting member additionally provided at an intermediate portion along the direction in which the fuel cell units are stacked, wherein the intermediate supporting member comprises a plate that is inserted into an intermediate portion of the fuel cell stack along the direction in which the fuel cell units are stacked and a mounting member used for installation of the fuel cell stack, and wherein the plate of the intermediate supporting member is provided with an insulating plate that insulates the fuel cell units situated on either side of the plate of the intermediate supporting member, and with terminal plates that sandwich the insulating plate and that are electrically connected by a pair of concavo-convex electrical connection terminals within the surface of the insulating plate.

4. A fuel cell stack for mounting in a vehicle in which a plurality of fuel cell units, each of which is formed by interposing a solid polymer electrolyte membrane between an anode electrode and a cathode electrode, are stacked in a horizontal direction with separators placed between each fuel cell unit, comprising:

a mounting member for installation of the fuel cell into the vehicle provided at an end plate that is provided at both ends along the direction in which the fuel cell units are stacked, at least one intermediate supporting member additionally provided at an intermediate portion along the direction in which the fuel cell units are stacked, and at least one piping mounting member to which pipes for fuel gas, oxygen gas and coolant are attached, said piping mounting member being provided at at least one end of said fuel cell stack, wherein the intermediate supporting member comprises a mounting member for mounting a plate to the vehicle and a plate that is inserted into an intermediate portion of the fuel cell stack between a first fuel cell unit and a second fuel cell unit along the direction in which the fuel cell units are stacked, such that at least one fuel cell unit is disposed on first and second sides of the intermediate supporting member.

5. A fuel cell stack for mounting in a vehicle in which a plurality of fuel cell units, each of which is formed by interposing a solid polymer electrolyte membrane between an anode electrode and a cathode electrode, are stacked in a horizontal direction with separators placed between each fuel cell unit, comprising:

a mounting member for installation of the fuel cell into the vehicle provided at an end plate that is provided at both ends along the direction in which the fuel cell units are stacked, at least one intermediate supporting member additionally provided at an intermediate portion along the direction in which the fuel cell units are stacked for supporting the fuel cell stack in the vicinity of the intermediate portion, and at least one piping mounting member to which pipes for fuel gas, oxygen gas and coolant are attached, said piping mounting member being provided in at least one end of said fuel cell stack, wherein the intermediate supporting member comprises a plate that is inserted into an intermediate portion of the fuel cell stack along the direction in which the fuel cell units are stacked and a mounting member for mounting the plate of the intermediate supporting member to the vehicle, the intermediate supporting member being provided at a central portion of the fuel cell stack along the direction in which the fuel cell units are stacked.

* * * * *